(12) United States Patent
Fairgrieve et al.

(10) Patent No.: US 10,486,695 B2
(45) Date of Patent: Nov. 26, 2019

(54) VEHICLE SPEED CONTROL SYSTEM AND METHOD

(71) Applicant: Jaguar Land Rover Limited, Whitley, Coventry, Warwickshire (GB)

(72) Inventors: Andrew Fairgrieve, Rugby (GB); Daniel Woolliscroft, Birmingham (GB); James Kelly, Solihull (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/776,772

(22) PCT Filed: Mar. 7, 2014

(86) PCT No.: PCT/EP2014/054425
§ 371 (c)(1),
(2) Date: Sep. 15, 2015

(87) PCT Pub. No.: WO2014/139875
PCT Pub. Date: Sep. 18, 2014

(65) Prior Publication Data
US 2016/0023657 A1  Jan. 28, 2016

(30) Foreign Application Priority Data
Mar. 15, 2013 (GB) .................................. 1304847.5

(51) Int. Cl.
*B60W 30/14* (2006.01)
*B60W 10/04* (2006.01)
(Continued)

(52) U.S. Cl.
CPC .......... *B60W 30/143* (2013.01); *B60G 17/005* (2013.01); *B60W 10/04* (2013.01);
(Continued)

(58) Field of Classification Search
CPC .... B60G 17/005; B60W 30/143; B60W 10/18
(Continued)

(56) References Cited

U.S. PATENT DOCUMENTS 8,374,765 B1    2/2013  Rubin
2008/0294321 A1* 11/2008 Yamakado ......... B60K 31/0066
701/93

(Continued)

FOREIGN PATENT DOCUMENTS

EP    1577148 A2    9/2005
EP    2712781 A2    4/2014
(Continued)

OTHER PUBLICATIONS

International Search Report for application No. PCT/EP2014/054425 dated May 15, 2014, 6 pages.
(Continued)

*Primary Examiner* — Charles A Fox
*Assistant Examiner* — Michael E Butler
(74) *Attorney, Agent, or Firm* — Reising Ethington P.C.

(57) ABSTRACT

A system for controlling the speed of a vehicle, the system being operable to cause the vehicle to accelerate from a first speed to a second speed in accordance with a selected one of a plurality of acceleration profiles, the profile being selected in dependence on a selected one of a plurality of vehicle operating modes.

22 Claims, 8 Drawing Sheets

(51) Int. Cl.
*B60W 10/18* (2012.01)
*B60G 17/005* (2006.01)

(52) U.S. Cl.
CPC ....... *B60W 10/18* (2013.01); *B60W 2550/143* (2013.01); *B60W 2720/103* (2013.01); *B60W 2720/106* (2013.01)

(58) Field of Classification Search
USPC .......................................................... 701/93
See application file for complete search history.

(56) References Cited

U.S. PATENT DOCUMENTS

| | | | | |
|---|---|---|---|---|
| 2009/0321165 | A1* | 12/2009 | Haug | B60W 20/00 180/65.275 |
| 2010/0121549 | A1* | 5/2010 | Fukuda | B60W 30/188 701/93 |
| 2011/0040438 | A1* | 2/2011 | Kluge | G01C 21/3469 701/31.4 |
| 2011/0307166 | A1* | 12/2011 | Hiestermann | G01C 21/32 701/119 |
| 2012/0197501 | A1* | 8/2012 | Sujan | B60K 23/00 701/51 |
| 2012/0290187 | A1* | 11/2012 | Oesterreicher | B60W 50/0205 701/99 |
| 2014/0163798 | A1* | 6/2014 | Ross | B60W 30/182 701/22 |
| 2015/0094927 | A1* | 4/2015 | Takahashi | B60W 30/025 701/93 |
| 2015/0203115 | A1* | 7/2015 | Fairgrieve | B60W 50/14 701/93 |

FOREIGN PATENT DOCUMENTS

| | | |
|---|---|---|
| FR | 2899190 A1 | 10/2007 |
| JP | 2009113763 A | 5/2009 |
| WO | 2007070160 A2 | 6/2007 |
| WO | 2007132213 A1 | 11/2007 |
| WO | 2001126430 A1 | 10/2011 |
| WO | 2011143165 A1 | 11/2011 |
| WO | 2014027113 A1 | 2/2014 |
| WO | WO2014027113 A1 * | 2/2014 ............. B60T 8/175 |

OTHER PUBLICATIONS

GB Combined Search and Examination Report for corresponding application No. GB1304847.5, dated May 30, 2013, 8 pages.
Written Opinion for application No. PCT/EP2014/054425 dated May 15, 2014, 9 pages.

* cited by examiner

VEHICLE SPEED CONTROL SYSTEM AND METHOD

FIELD OF THE INVENTION

The invention relates to a system for controlling the speed of a vehicle. In particular, but not exclusively, the invention relates to a system for controlling the speed of a land-based vehicle which is capable of driving in a variety of different and extreme terrains and conditions.

The content of co-pending UK patent application no GB1214651.0 is hereby incorporated by reference.

BACKGROUND TO THE INVENTION

In known vehicle speed control systems, typically referred to as cruise control systems, the vehicle speed is maintained on-road once set by the user without further intervention by the user so as to improve the driving experience for the user by reducing workload.

The user selects a speed at which the vehicle is to be maintained, and the vehicle is maintained at that speed for as long as the user does not apply a brake or, in some systems, the clutch. The cruise control system takes its speed signal from the driveshaft or wheel speed sensors. When the brake or the clutch is depressed, the cruise control system is disabled so that the user can change the vehicle speed without resistance from the system. II the user depresses the accelerator pedal the vehicle speed will increase, but once the user removes his foot from the accelerator pedal the vehicle reverts to the pre-set cruise speed.

More sophisticated cruise control systems are integrated into the engine management system and may include an adaptive functionality which takes into account the distance to the vehicle in front using a radar-based system. For example, the vehicle may be provided with a forward-looking radar detection system so that the speed and distance of the vehicle in front is detected and a safe following speed and distance is maintained automatically without the need for user input. If the lead vehicle slows down, or another object is detected by the radar detection system, the system sends a signal to the engine or the braking system to slow the vehicle down accordingly.

Such systems are usually operable only above a certain speed, typically around 15-20 mph, and are ideal in circumstances in which the vehicle is traveling in steady traffic conditions, and particularly on highways or motorways. In congested traffic conditions, however, where vehicle speed tends to vary widely, cruise control systems are ineffective, and especially where the systems are inoperable because of a minimum speed requirement. A minimum speed requirement is often imposed on cruise control systems so as to reduce the likelihood of low speed collision, for example when parking. Such systems are therefore ineffective in certain driving conditions (e.g. low speed) and are set to be automatically disabled in circumstances in which a user may not consider it to be desirable to do so.

Known cruise control systems also cancel in the event that a wheel slip event is detected requiring intervention by a traction control system (TCS) or stability control system (SCS). Accordingly, they are not well suited to maintaining vehicle progress when driving in off road conditions where such events may be relatively common.

It is also known to provide a control system for a motor vehicle for controlling one or more vehicle subsystems. U.S. Pat. No. 7,349,776, the content of which is hereby incorporated by reference, discloses a vehicle control system comprising a plurality of subsystem controllers including an engine management system, a transmission controller, a steering controller, a brakes controller and a suspension controller. The subsystem controllers are each operable in a plurality of subsystem function modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller.

It is desirable to provide a speed control system capable of controlling vehicle speed at relatively low speeds and whilst driving in off road conditions.

Statements of Invention

Embodiments of the invention may be understood with reference to the appended claims.

Aspects of the present invention provide a system, a vehicle and a method.

In one aspect of the invention for which protection is sought there is provided a system for controlling the speed of a vehicle, the system being operable to cause the vehicle to accelerate from a first speed to a second speed in accordance with a selected one of a plurality of acceleration profiles, the profile being selected in dependence on a selected one of a plurality of vehicle operating modes.

Thus, the vehicle is operable in a plurality of different respective operating modes, the system selecting the acceleration profile in dependence on the identity of the selected operating mode.

By acceleration profile is meant data enabling the system to cause the vehicle to accelerate from the first speed to the second speed at a prescribed rate of acceleration as a function of time. For one or more profiles, the rare of acceleration may vary as a function of time. For one or more other profiles, the rate of acceleration may be substantially constant. The data may be stored in the form of a value of acceleration as a function of time, a value of speed as a function of time, or any other suitable form.

A vehicle operating mode may be a mode of operation of the vehicle in which one or more vehicle sub-system operating parameters are set according to the prevailing driving conditions. The driving conditions may correspond to different types of terrain over which the vehicle may travel. Such modes may be referred to as terrain modes, or terrain response modes.

For example, in one embodiment one of a plurality of respective accelerator pedal/powertrain torque maps is selected in dependence on the type of terrain, such as a grass/gravel/snow terrain type, sand terrain type, and rocky terrain type. The terrain type may be detected automatically by the vehicle, or determined according to a user-operable terrain mode selector.

The system may be operable to select automatically the vehicle operating mode in dependence on a type of terrain over which the vehicle is operating.

The system may be operable to allow a user to select the vehicle operating mode.

In a further aspect of the invention for which protection is sought there is provided a system for controlling the speed of a vehicle, the system being operable to cause the vehicle to accelerate from a first speed to a second speed at a rate in accordance with a selected one of a plurality of characteristic profiles, the profile being selected in dependence on a type of terrain over which the vehicle is operating.

The system may be operable to determine a value of required vehicle speed at a given moment in time from the selected profile and to cause the vehicle to travel in accordance with the required speed, thereby to cause the vehicle to accelerate from the first speed to the second speed in accordance with the selected profile.

The profiles may correspond to data in respect of vehicle rate of acceleration as a function of time.

The profiles may correspond to data in respect of vehicle speed as a function of time.

Thus, the system may be operable to cause the vehicle to accelerate from the first speed to the second speed according to the data in respect of vehicle speed as a function of time, which may be considered to be an acceleration profile.

The first speed may correspond to a current value of vehicle speed.

The second speed may correspond to a set-speed.

The set-speed may correspond to a user defined set-speed.

The system may be operable to cause a powertrain to develop drive torque to accelerate one or more wheels of the vehicle and to control a braking system to develop brake torque to counter powertrain torque.

It is to be understood that the braking system may comprise a foundation braking system operable to apply friction brakes to brake one or more road wheels. In addition or instead the braking system may comprise a regenerative braking system. The regenerative braking system may comprise one or more electric machines. The one or more electric machines may be operable as propulsion motors or as generators to effect regenerative braking.

It is to be understood that the system may be operable to employ the braking system to control acceleration of the vehicle in order to accelerate the vehicle according to the required profile. This may be particularly useful when accelerating the vehicle from a rest (substantially stationary) condition to the second speed.

The system may be operable to cause the powertrain to develop drive torque to accelerate one or more wheels of the vehicle and to control the braking system to develop brake torque substantially simultaneously in order to counter powertrain torque, thereby to cause the vehicle to accelerate at a rate corresponding to the selected profile.

This feature has the advantage that wheel llare, in which a wheel experiences excessive slip on a driving surface, may be prevented or at least substantially reduced.

Thus, an amount of slip of one or more wheels may be controlled such that the amount of slip does not exceed a prescribed amount. This feature may be particularly useful when accelerating a vehicle from rest on a surface having a relatively low surface coefficient of friction.

The system may be operable to cause the braking system to develop brake torque to counter powertrain torque in dependence on the selected acceleration profile.

The profiles may correspond to and/or provide data in respect of a maximum allowable rate of acceleration of the vehicle.

The system may be configured to impose different maximum allowable rates of acceleration in dependence on whether the vehicle is ascending a slope or descending a slope.

The maximum allowable rate of acceleration of the vehicle may be greater if the vehicle is ascending a slope compared with that allowed if the vehicle is descending a slope.

Alternatively, the maximum allowable rate of acceleration may be lower if the vehicle is ascending a slope compared with that allowed if the vehicle is descending a slope.

Alternatively or in addition, in some embodiments the maximum allowable rate of acceleration may be lower if a vehicle is ascending a slope compared with that if the vehicle is travelling over substantially level terrain.

The system may be operable to impose different maximum allowable rates of deceleration in dependence on whether the vehicle is ascending a slope or descending a slope.

In some embodiments, the control system may be operable to impose a higher maximum allowable rate of deceleration it the vehicle is ascending a slope compared with that imposed if the vehicle is descending a slope.

In some embodiments, the maximum allowable rate of deceleration if the vehicle is ascending a slope may be higher than that it the vehicle is travelling over level terrain. The maximum allowable rate of deceleration if the vehicle is descending a slope may be lower than that if the vehicle is travelling over level terrain.

Other arrangements are also useful.

The system may be operable to determine whether the vehicle is ascending a slope or incline by means of data in respect of an output of one or more sensors such as a vehicle attitude or pitch sensor.

The maximum allowable values of acceleration and/or deceleration may be determined in dependence at least in part on a magnitude of an angle of pitch of the vehicle with respect to horizontal.

For example, the maximum allowable rate of deceleration may reduce with increasing angle of pitch below a substantially horizontal attitude. The maximum allowable rate of deceleration may increase with increasing angle of pitch above a substantially horizontal attitude.

The maximum allowable rate of acceleration may reduce with increasing angle of pitch above a substantially horizontal attitude. The maximum allowable rate of acceleration may increase with increasing angle of pitch below a substantially horizontal attitude. Other arrangements are also useful.

The maximum allowable values may be set in accordance at least in part with consideration for occupant comfort.

In one aspect of the invention for which protection is sought there is provided a method of controlling the speed of a vehicle, comprising: causing the vehicle to accelerate from a first speed to a second speed in accordance with a selected one of a plurality of acceleration profiles, the profile being selected in dependence on a selected one of a plurality of vehicle operating modes.

In a further aspect of the invention for which protection is sought there is provided a method of controlling the speed of a vehicle, comprising: causing the vehicle to accelerate from a first speed to a second speed at a rate in accordance with a selected one of a plurality of characteristic profiles, the profile being selected in dependence on a type of terrain over which the vehicle is operating.

In an aspect of the invention for which protection is sought there is provided a system for controlling the speed of a vehicle, the system being operable to cause the vehicle to accelerate from a first speed to a second speed at a rate not exceeding a prescribed rate, the prescribed rate doing selected in dependence on a selected one of a plurality of vehicle operating modes.

In a further aspect of the invention for which protection is sought there is provided a system for controlling the speed of a vehicle, the system being operable to cause the vehicle to accelerate from a first speed to a second speed at a rate not exceeding a prescribed rate, the prescribed rate being selected in dependence on a type of terrain over which the vehicle is operating.

In one aspect of the invention for which protection is sought there is provided a method of controlling the speed of a vehicle, comprising: causing the vehicle to accelerate from a first speed to a second speed at a rate not exceeding a prescribed rate, the prescribed rate being selected in dependence on a selected one of a plurality of vehicle operating modes.

In a further aspect of the invention for which protection is sought there is provided a method of controlling the speed of a vehicle, comprising: causing the vehicle to accelerate from a first speed to a second speed at a rate not exceeding a prescribed rate, the prescribed rate being selected in dependence on a type of terrain over which the vehicle is operating.

It is to be understood that the set-speed may also be referred to herein as a 'target speed' and the terms 'target speed' and 'set-speed' are used interchangeably herein.

It will be appreciated that preferred and/or optional features of any one aspect of the invention may be incorporated alone or in appropriate combination within the any other aspect of the invention also.

BRIEF DESCRIPTION OF THE DRAWINGS

The invention will now be described by way of example only with reference to the following figures in which.

DETAILED DESCRIPTION

References herein to a block such as a function block are to be understood to include reference to software code for performing the function or action specified in which an output is provided responsive to one or more inputs. The code may be in the form of a software routine or function called by a main computer program, or may be code forming part of a flow of code not being a separate routine or function. Reference to function block is made for ease of explanation of the manner of operation of the controller.

Figure 1:
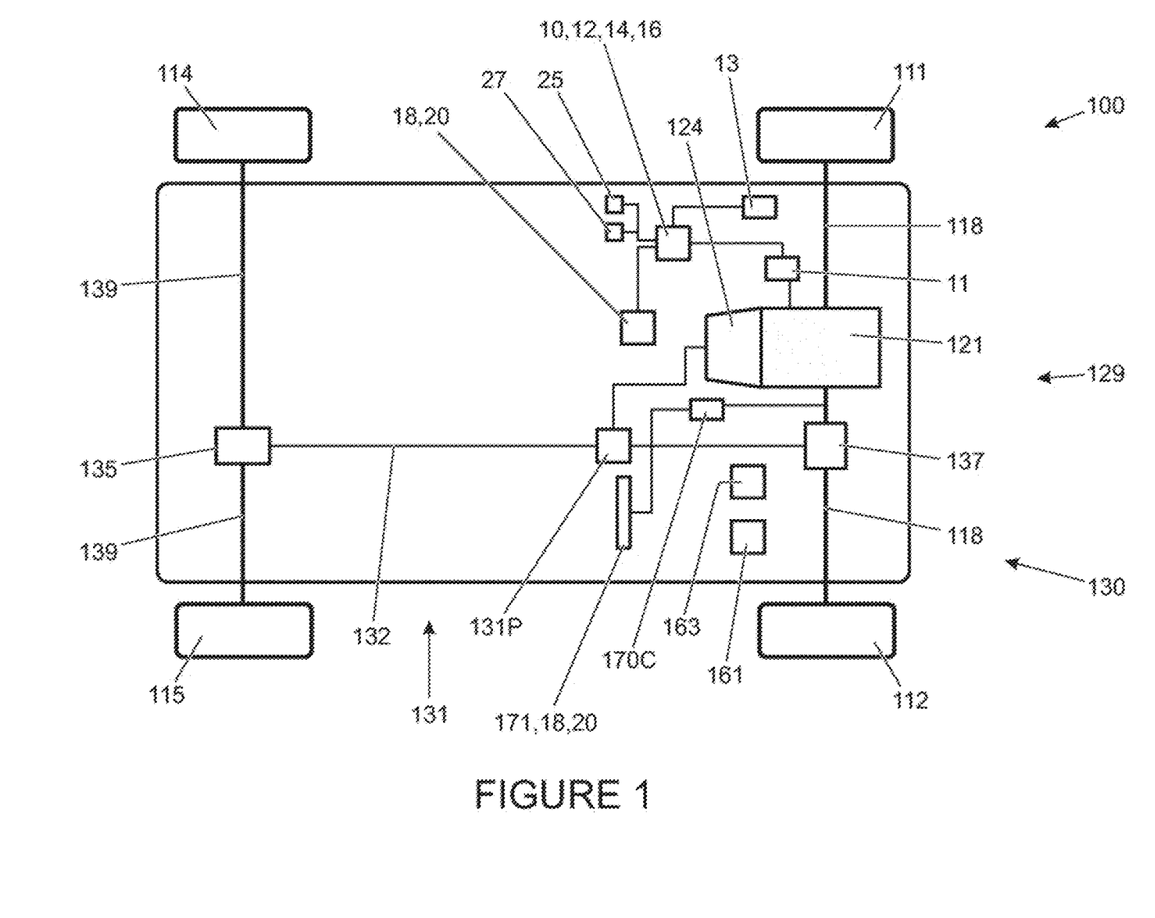
FIG. 1 is a schematic illustration of a vehicle according to an embodiment of the invention in plan view.
Figure 2:
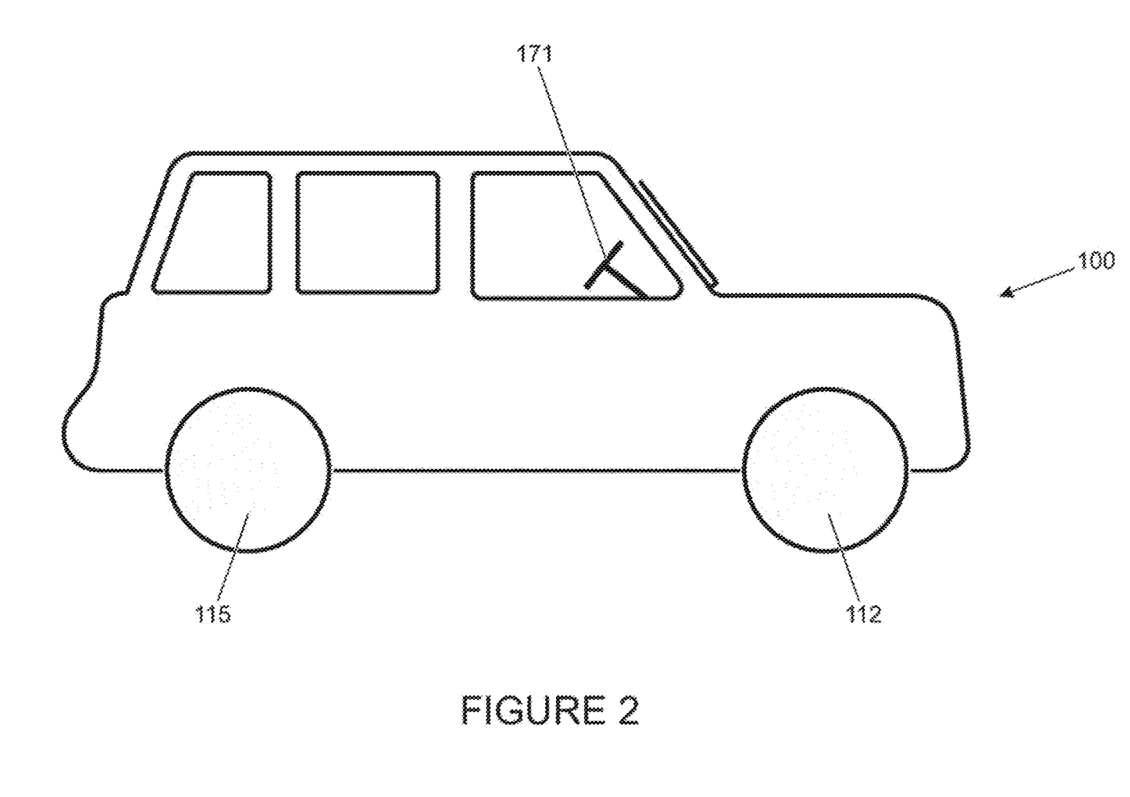
FIG. 2 shows the vehicle of FIG. 1 in side view.

FIG. 1 shows a vehicle 100 according to an embodiment of the invention having a powertrain 129. The powertrain 129 includes an engine 121 that is connected to a driveline 130 having an automatic transmission 124. Embodiments of the present invention are suitable for use in vehicles with manual transmissions, continuously variable transmissions or any other suitable transmission.

The driveline 130 is arranged to drive a pair of front vehicle wheels 111,112 by means of a front differential 137 and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. Embodiments of the invention are suitable for use with vehicles in which the transmission is arranged to drive only a pair of front wheels or only a pair of rear wheels (i.e. front wheel drive vehicles or rear wheel drive vehicles) or selectable two wheel drive/four wheel drive vehicles. In the embodiment of FIG. 1 the transmission 124 is releasably connectable to the auxiliary driveline portion 131 by means of a power transfer unit (PTU) 131P, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

Figure 3:
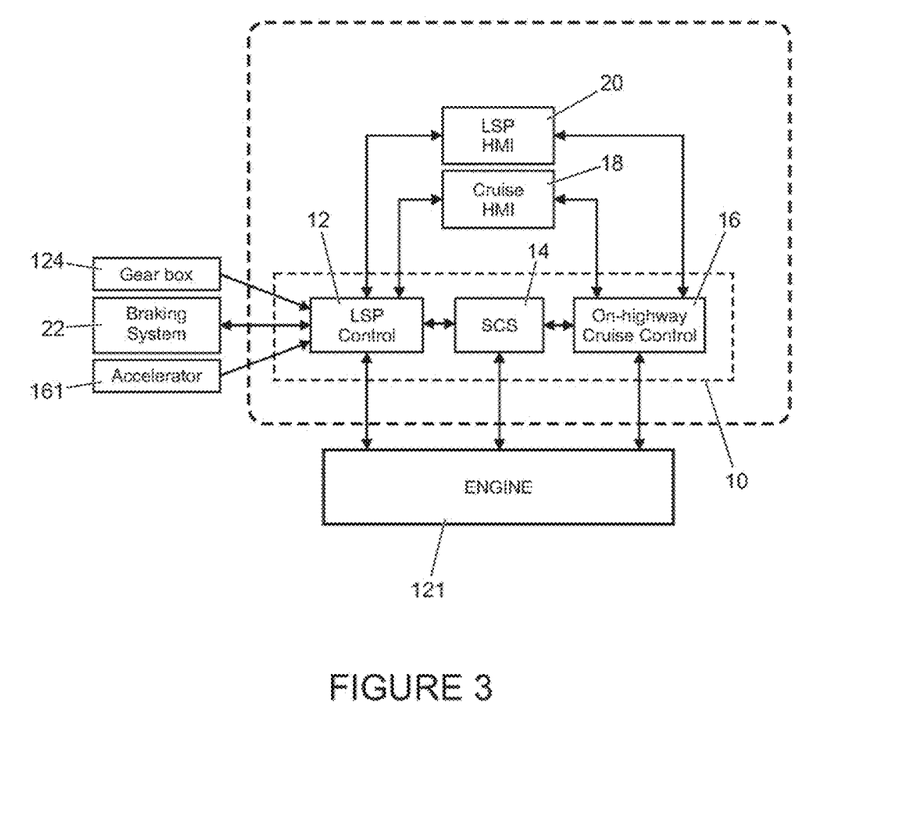
FIG. 3 is a high level schematic diagram of an embodiment of the vehicle speed control system of the present invention, including a cruise control system and a low-speed progress control system.

A control system for the vehicle engine 121 includes a central controller, referred to as a vehicle control unit (VCU) 10, a powertrain controller 11, a brake controller 13 and a steering controller 170C. The brake controller 13 forms part of a braking system 22 (FIG. 3). The VCU 10 receives and outputs a plurality of signals to and from various sensors and subsystems (not shown) provided on the vehicle. The VCU 10 includes a low-speed progress (LSP) control system 12 shown in FIG. 3 and a stability control system (SCS) 14, the latter being a known component of existing vehicle control systems. The SCS 14 improves the safety of the vehicle 100 by detecting and managing loss of traction. When a reduction in traction or steering control is detected, the SCS 14 is operable automatically to command a brake controller 13 to apply one or more brakes of the vehicle to help to steer the vehicle 100 in the direction the user wishes to travel. In the embodiment shown the SCS 14 is implemented by the VCU 10. In some alternative embodiments the SCS 14 may be implemented by the brake controller 13. Further alternatively, the SCS 14 may be implemented by a separate controller.

Although not shown in detail in FIG. 3, the VCU 10 further includes a Dynamic Stability Control (DSC) function block, a Traction Control (TC) function block, an Anti-Lock Braking System (ABS) function block and a Hill Descent Control (HDC) function block. These function blocks are implemented in software code run by a computing device of the VCU 10 and provide outputs indicative of, for example, DSC activity, TC activity, ABS activity, brake interventions on individual wheels and engine torque requests from the VCU 10 to the engine 121 in the event a wheel slip event occurs. Each of the aforementioned events indicate that a wheel slip event has occurred. Other vehicle sub-systems such as a roll stability control system or the like may also be useful.

Figure 6:
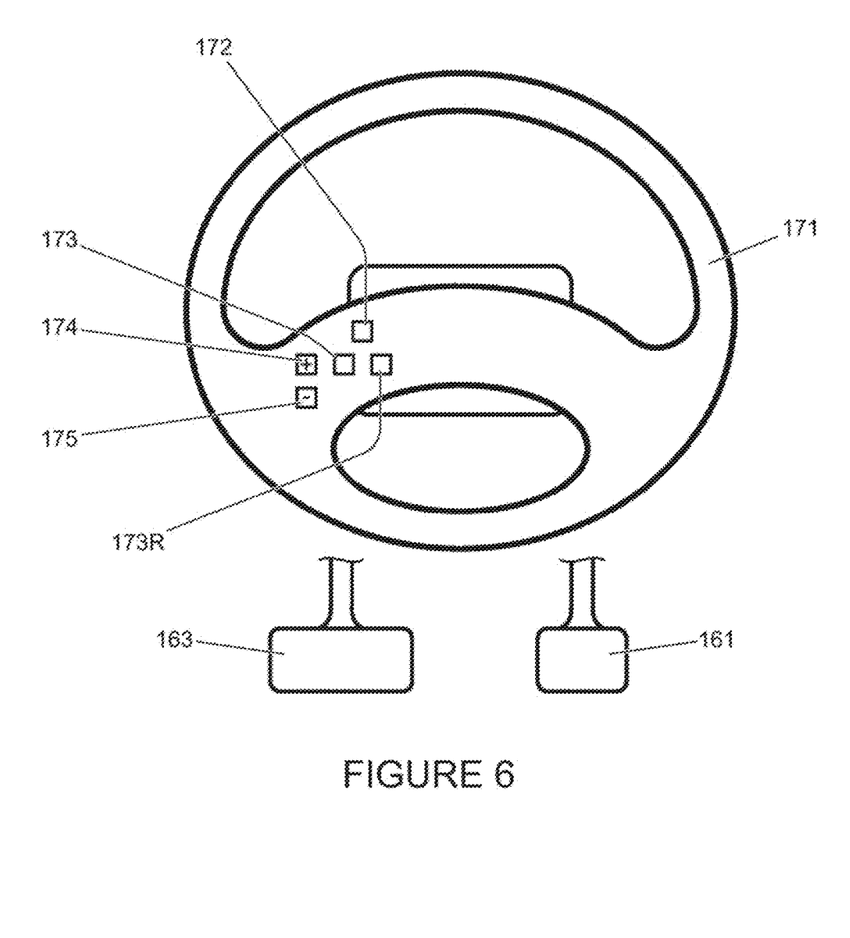
FIG. 6 illustrates a steering wheel and brake and accelerator pedals of a vehicle according to an embodiment of the present invention.

The vehicle 100 also includes a cruise control system 16 which is operable to automatically maintain vehicle speed at a selected speed when the vehicle is travelling at speeds in excess of 30 kph. The cruise control system 16 is provided with a cruise control HMI (human machine interface) 18 by which means the user can input a target vehicle speed to the cruise control system 16 in a known manner. In one embodiment of the invention, cruise control system input controls are mounted to a steering wheel 171 (FIG. 6). Depression of a 'set-speed' control 173 sets the set-speed to the current vehicle speed. Depression of a '+' button 174 allows the set-speed to be increased whilst depression of a '−' button 175 allows the set-speed to be decreased. In some embodiments, if the cruise control system 16 is not active when the '+' button 174 is depressed, the cruise control system 16 is activated.

The cruise control system 16 monitors vehicle speed and any deviation from the target vehicle speed is adjusted automatically so that the vehicle speed is maintained at a substantially constant value, typically in excess of 30 kph. In other words, the cruise control system is ineffective at speeds lower than 30 kph. The cruise control HMI 18 may also be configured to provide an alert to the user about the status of the cruise control system 16 via a visual display of the HMI 18.

The LSP control system 12 provides a speed-based control system for the user which enables the user to select a very low target speed at which the vehicle can progress without any pedal inputs being required by the user. This low-speed progress control function is not provided by the on-highway cruise control system 16 which operates only at speeds above 30 kph. Furthermore, known on-highway cruise control systems including the present system 16 are configured so that, in the event that the user depresses the brake or the clutch, the cruise control function is cancelled and the vehicle 100 reverts to a manual mode of operation which requires user pedal input to maintain vehicle speed. In addition, defection of a wheel slip event, as may be initiated by a loss of traction, also has the effect of cancelling the cruise control function.

The LSP control system 12 is operable to apply selective powertrain, traction control and braking actions to the wheels of the vehicle, collectively or individually, to maintain the vehicle 100 at the desired speed. It is to be understood that if the vehicle 100 is operating in a two wheel drive mode in which only front wheels 111, 112 are driven, the control system 12 may be prevented from applying drive torque to rear wheels 113, 114 of the vehicle 100.

The user inputs the desired target speed to the LSP control system 12 via a low-speed progress control HMI (LSP HMI) 20 (FIG. 1, FIG. 3). The LSP control system 12 operates at vehicle speeds typically below about 50 kph but does not activate until vehicle speed drops to below 30 kph when the cruise control system of the vehicle becomes ineffective. The LSP control system 12 is configured to operate independently of a traction event, i.e. the system 12 does not cancel speed control upon detection of wheel slip. Rather, the LSP control system 12 actively manages vehicle behaviour and in this way, at least, differs from the functionality of the cruise control system 16, as will be described in further detail below.

The LSP control HMI 20 is provided in the vehicle cabin so as to be readily accessible to the user. The user of the vehicle is able to input to the LSP control system 12, via the LSP HMI 20, an indication of the speed at which the user desires the vehicle to travel (referred to as "the target speed"). The LSP HMI 20 also includes a visual display upon which information and guidance can be provided to the user about the status of the LSP control system 12.

The LSP control system 12 receives an input from the braking system 22 of the vehicle indicative of the extent to which the user has applied braking by means of a brake pedal 163. The LSP control system 12 also receives an input from an accelerator pedal 161 indicative of the extent to which the user has depressed the accelerator pedal 161. An input is also provided to the LSP control system 12 from the transmission or gearbox 124. This input may include signals representative of, for example, the speed of an output shaft of the gearbox 124, torque converter slip and a gear ratio request. Other inputs to the LSP control system 12 include an input from the cruise control HMI 18 which is representative of the status (ON/OFF) of the cruise control system 16, and an input from the LSP control HMI 20 which is representative of the status of the LSP control function.

The cruise control HMI 18 and the LSP HMI 20 have input controls provided on a steering wheel of the vehicle for convenience of operation by the user.

FIG. 6 shows the steering wheel 171 of the vehicle 100 of FIG. 1 in more detail, together with the accelerator and brake pedals 161, 163. As noted above, the steering wheel 171 bears user operable input controls of the cruise control HMI 18 and LSP control HMI 20. As in the case of a conventional vehicle, the steering wheel 171 has a 'set-speed' control 173, actuation of which enables a user to activate the cruise control system 16 to maintain the current vehicle speed. The wheel 171 also has a 'LSP' control activation button 172 for activating the LSP control system 12 and a resume button 173R. The resume button 173R may be used to control both the 'on-highway' cruise control system 16 when driving on road, and the LSP control system 12 when driving off-road, to resume a previously set (user defined) set-speed.

If the vehicle is operating on-highway, depression of set-speed control 173 causes the cruise control system 16 to activate provided the current vehicle speed is within the operating range of the cruise control system 16. Depression of the '+' control 174 causes the cruise control system 16 to increase the set-speed whilst depression of the '−' control 175 causes the cruise control system 16 to decrease the set-speed. It will be appreciated that '+' and '−' controls may be on a single button in some arrangements, such as a rocker-type button. In some embodiments, the '+' control 174 may function as a 'set-speed' control, in which case set-speed control 173 may be eliminated.

If the vehicle is operating off-highway, depression of set-speed control 173 causes the LSP control system 12 to activate and operate as described above, provided vehicle speed is within the operating range of the LSP control system 12.

In some embodiments the system may further comprise a 'cancel' button operable to cancel speed control by the LSP control system 12. In some embodiments, the LSP system may be in either one of an active condition or a standby condition. In the present embodiment the LSP control system 12 is also operable to assume an intermediate condition in which vehicle speed control by the LSP control system 12 is suspended but a hill descent control (HDC) system or the like may remain active if already active. Other arrangements are also useful.

With the LSP control system 12 active, the user may increase or decrease the vehicle set-speed by means of the '+' and buttons 174, 175. In addition, the user may also increase or decrease the vehicle set-speed by lightly pressing the accelerator or brake pedals 161, 163 respectively. In some embodiments, with the LSP control system 12 active the '+' and '−' buttons 174, 175 are disabled. This latter feature may prevent changes in set-speed by accidental pressing of one of these buttons, for example when negotiating difficult terrain where relatively large and frequent changes in steering angle may be required. Other arrangements are also useful.

Figure 4:
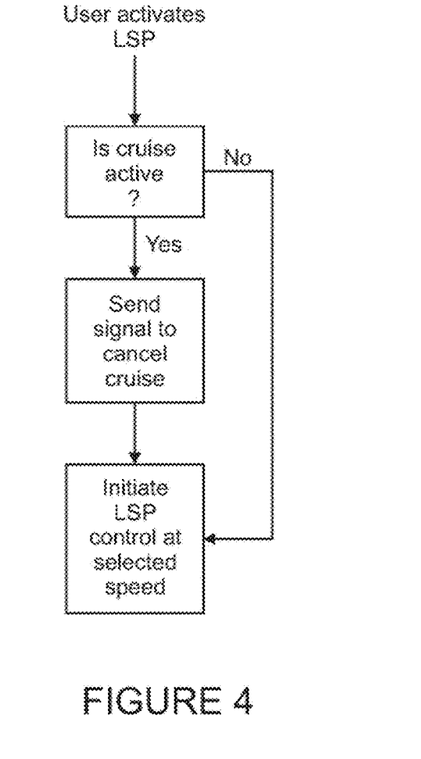
FIG. 4 is a flow diagram to illustrate the interaction between the cruise control system and the low-speed progress control system in FIG. 3.

FIG. 4 shows a flow process to illustrate the interaction between the cruise control system 18 and the LSP control system 12. If cruise control is active when the user tries to activate the LSP control system 12 via the LSP control HMI 20, a signal is sent to the cruise control system 16 to cancel the speed control routine. The LSP control system 12 is then initiated and the vehicle speed is maintained at the target speed selected by the user via the LSP HMI 20. It is also the case that if the LSP control system 12 is active, operation of the cruise control system 16 is inhibited. The two systems 12, 16 therefore operate independently of one another, so that only one can be operable at any one time, depending on the speed at which the vehicle is travelling.

In some embodiments, the cruise control system 16 may hand over vehicle speed control to the LSP control system 12 if a user reduces set-speed of the vehicle 100 to a value within the operating speed range of the LSP control system 12. Similarly, in some embodiments the LSP control system 16 may hand over vehicle speed control to the cruise control system 16 if a user raises vehicle set-speed to a value that is within the operating range of the cruise control system 16. Other arrangements are also useful.

In some embodiments, the cruise control HMI 18 and the LSP control HMI 20 may be configured within the same hardware so that, for example, the speed selection is input via the same hardware, with one or more separate switches being provided to switch between the LSP input and the cruise control input.

Figure 5:
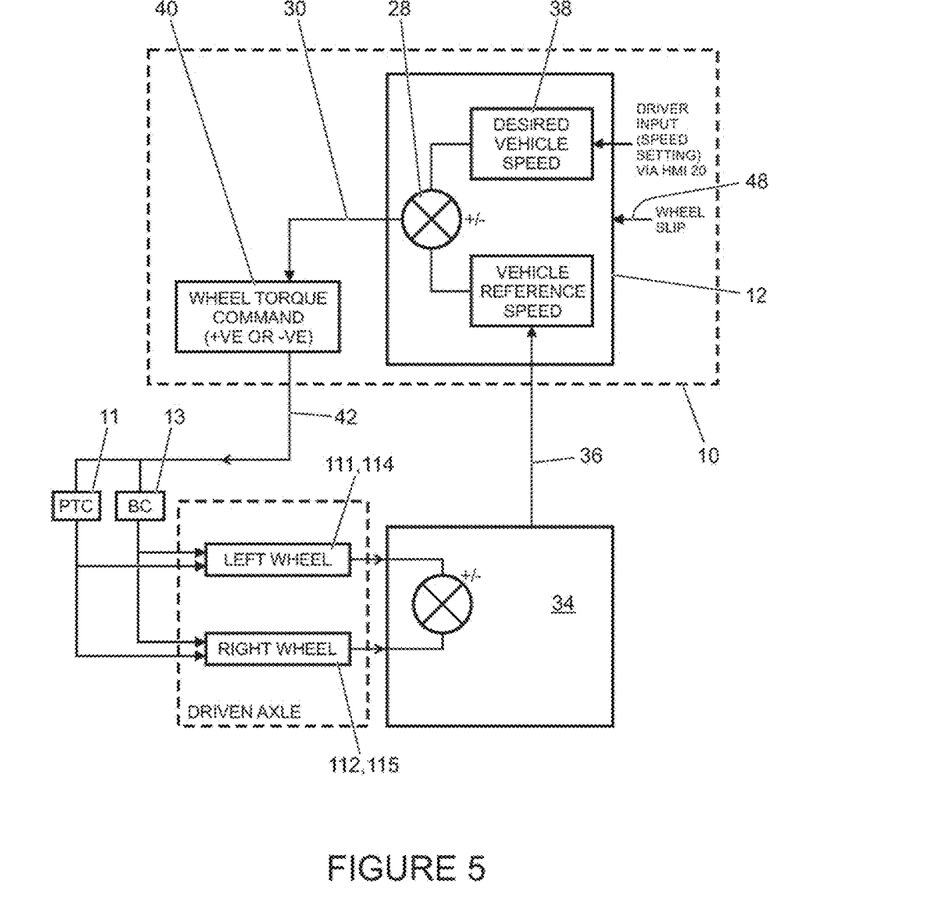
FIG. 5 is a schematic diagram of further features of the vehicle speed control system in FIG. 3.

FIG. 5 illustrates the means by which vehicle speed is controlled in the LSP control system 12. As described above, a speed selected by a user (set-speed) is input to the LSP control system 12 via the LSP control HMI 20. A vehicle speed sensor 34 associated with the powertrain 129 (shown in FIG. 1) provides a signal 36 indicative of vehicle speed to the LSP control system 12. The LSP control system 12 includes a comparator 28 which compares the set-speed (also referred to as a 'target speed' 38) selected by the user with the measured speed 36 and provides an output signal 30 indicative of the comparison. The output signal 30 is provided to an evaluator unit 40 of the VCU 10 which interprets the output signal 30 as either a demand for additional torque to be applied to the vehicle wheels 111-115, or for a reduction in torque applied to the vehicle wheels 111-115, depending on whether the vehicle speed needs to be increased or decreased to maintain the speed that has been selected by the user. An increase in torque is generally accomplished by increasing the amount of powertrain torque delivered to a given position of the powertrain, for example an engine output shaft, a wheel or any other suitable location. A decrease in torque to a value that is less positive or more negative may be accomplished by decreasing powertrain torque delivered to a wheel and/or by increasing a braking force on a wheel. It is to be understood that in some embodiments in which a powertrain 129 has an electric machine operable as a generator, negative torque may be applied by the powertrain 123 to one or mere wheels. It is to be understood that a brake controller 13 may nevertheless be involved in determining whether brake torque is required to be provided by an electric machine of a powertrain 129, and whether brake torque should be provided by an electric machine or a friction-based foundation braking system 22.

An output 42 from the evaluator unit 40 is provided to the powertrain controller 11 and brake controller 13 which in turn control a net torque applied to the vehicle wheels 111-115. The net torque may be increased or decreased depending on whether there is a positive or negative demand for torque from the evaluator unit 40. Thus, in order to initiate application of the necessary positive or negative torque to the wheels, the evaluator unit 40 may command that additional power is applied to the vehicle wheels and/or that a braking force is applied to the vehicle wheels, either or both of which may be used to implement the change in torque that is necessary to maintain the target vehicle speed. In the illustrated embodiment the torque is applied to the vehicle wheels individually so as to maintain the target vehicle speed, but in another embodiment torque may be applied to the wheels collectively to maintain the target speed. In some embodiments, the powertrain controller 11 may be operable to control an amount of torque applied to one or more wheels by controlling a driveline component such as a rear drive unit, front drive unit, differential or any other suitable component. For example, one or more components of the driveline 130 may include one or more clutches operable to allow an amount of torque applied to one or more wheels to be varied. Other arrangements are also useful.

Where a powertrain 129 includes one or more electric machines, for example one or more propulsion motors and/or generators, the powertrain controller 11 may be operable to modulate torque applied to one or more wheels by means of one or more electric machines. In some embodiments, the one or more electric machines may be operable as either a propulsion motor or a generator under the control of the powertrain controller 11. Thus the powertrain controller 11 may in some embodiments be controlled to apply more positive or more negative torque to one or more wheels by means of an electric machine.

The LSP control system 12 also receives a signal 48 indicative of a wheel slip event having occurred. This may be the same signal 48 that is supplied to the on-highway cruise control system 16 of the vehicle, and which in the case of the latter triggers an override or inhibit mode of operation in the on-highway cruise control system 16 so that automate control of the vehicle speed by the on-highway cruise control system 16 is suspended or cancelled. However, the LSP control system 12 is not arranged to cancel of suspend operation in dependence on receipt of a wheel slip signal 48 indicative of wheel slip. Rather, the system 12 is arranged to monitor and subsequently manage wheel slip so as to reduce driver workload. During a slip event, the LSP control system 12 continues to compare the measured vehicle speed with the desired vehicle speed as input by the user, and continues to control automatically the torque applied across the vehicle wheels so as to maintain vehicle speed at the selected value. It is to be understood therefore that the LSP control system 12 is configured differently to the cruise control system 16, for which a wheel slip event has the effect of overriding the cruise control function so that manual operation of the vehicle must be resumed, or the cruise control function reset.

A further embodiment of the invention (not shown) is one in which the vehicle is provided with a wheel slip signal 48 derived not just from a comparison of wheel speeds, but further refined using sensor data indicative of the vehicle's speed over ground. Such speed over ground determination may be made via global positioning (GPS) data, or via a vehicle mounted radar or laser based system arranged to determine the relative movement of the vehicle and the ground over which it is travelling. A camera system may be employed for determining speed over ground in some embodiments.

At any stage of the LSP control process the user can override the function by depressing the accelerator pedal 161 and/or brake pedal 163 to adjust the vehicle speed in a positive or negative sense. However, in the event that a wheel slip event is detected via signal 48, the LSP control system 12 remains active and control of vehicle speed by the LSP control system 12 is not suspended. As shown in FIG. 5, this may be implemented by providing a wheel slip event signal 48 to the LSP control system 12 which is then managed by the LSP control system 12. In the embodiment shown in FIG. 1 the SCS 14 generates the wheel slip event signal 48 and provides it to the LSP control system 12 and cruise control system 16.

A wheel slip event is triggered when a loss of traction occurs at any one of the vehicle wheels. Wheels and tyres may be more prone to losing traction when travelling on snow, ice, mud or sand and/or on steep gradients or cross-slopes, for example, or in environments where the terrain is more uneven or slippery compared with driving on a highway in normal on-road conditions. Embodiment of the present invention therefore find particular benefit when the vehicle is being driven in an off-road environment or in conditions in which wheel slip may commonly occur. Manual operation by the user in such conditions can be a difficult and often stressful experience and may result in an uncomfortable ride. Embodiments of the present invention enable continued progress to be made at a relatively low target speed without the need for user intervention.

The vehicle 100 is also provided with additional sensors (not shown) which are representative of a variety of different parameters associated with vehicle motion and status. These may be inertial systems unique to the speed control system or part of an occupant restraint system or any other subsystem which may provide data from sensors such as gyros and/or accelerometers that may be indicative of vehicle body movement and may provide a useful input to the LSP control system 12. The signals from the sensors provide, or are used to calculate, a plurality of driving condition indicators (also referred to as terrain indicators) which are indicative of the nature of the terrain conditions over which the vehicle is travelling. The signals are provided to the VCU 10 which determines the most appropriate control mode for the various subsystems on the basis of the terrain indicators, and automatically controls the subsystems accordingly. This aspect of the invention is described in further detail in our co-pending patent application nos. GB1111288.5, GB1211910.3 and GB1202427.9, the contents of each of which is incorporated herein by reference.

The sensors (not shown) on the vehicle include, but are not limited to, sensors which provide continuous sensor outputs to the VCU 10, including wheel speed sensors, as mentioned previously and as shown in FIG. 5, an ambient temperature sensor, an atmospheric pressure sensor, tyre pressure sensors, wheel articulation sensors, gyroscopic sensors to detect vehicular yaw, roll and pitch angle and rate, a vehicle speed sensor, a longitudinal acceleration sensor, an engine torque sensor (or engine torque estimator), a steering angle sensor, a steering wheel speed sensor, a gradient sensor for gradient estimator), a lateral acceleration sensor which may be part of the stability control system (SCS), a brake pedal position sensor, a brake pressure sensor, an accelerator pedal position sensor, longitudinal, lateral and vertical motion sensors, and water detection sensors forming part of a vehicle wading assistance system (not shown). In other embodiments, only a selection of the aforementioned sensors may be used.

The VCU 10 also receives a signal from the steering controller 170C. The steering controller is in the form of an electronic power assisted steering unit (ePAS unit). The steering controller 170C provides a signal to the VCU 10 indicative of the steering force being applied to steerable road wheels 111, 112 of the vehicle 100. This force corresponds to that applied by a user to the steering wheel 171 in combination with steering force generated by the ePAS unit 170C.

The VCU 10 evaluates the various sensor inputs to determine the probability that each of a plurality of different control modes for the vehicle subsystems is appropriate, with each control mode corresponding to a particular terrain type over which the vehicle is travelling (for example, mud and ruts, sand, grass/gravel/snow). The VCU 10 then selects which of the control modes is most appropriate and controls various vehicle parameters accordingly.

The nature of the terrain over which the vehicle is travelling (as determined by reference to the selected control mode) may also be utilised in the LSP control system 12 to determine an appropriate increase or decrease in drive torque to be applied to the vehicle wheels. For example, if the user selects a target speed that is not suitable for the nature of the terrain over which the vehicle is travelling, the system 12 is operable to automatically adjust the vehicle speed downwards by reducing the speed of the vehicle wheels. In some cases, for example, the user selected speed may not be achievable or appropriate over certain terrain types, particularly in the case of uneven or rough surfaces. If the system 12 selects a set-speed that differs from the user-selected set-speed (i.e. target speed), a visual indication of the speed constraint is provided to the user via the LSP HMI 20 to indicate that an alternative speed has been adopted.

Figure 7:
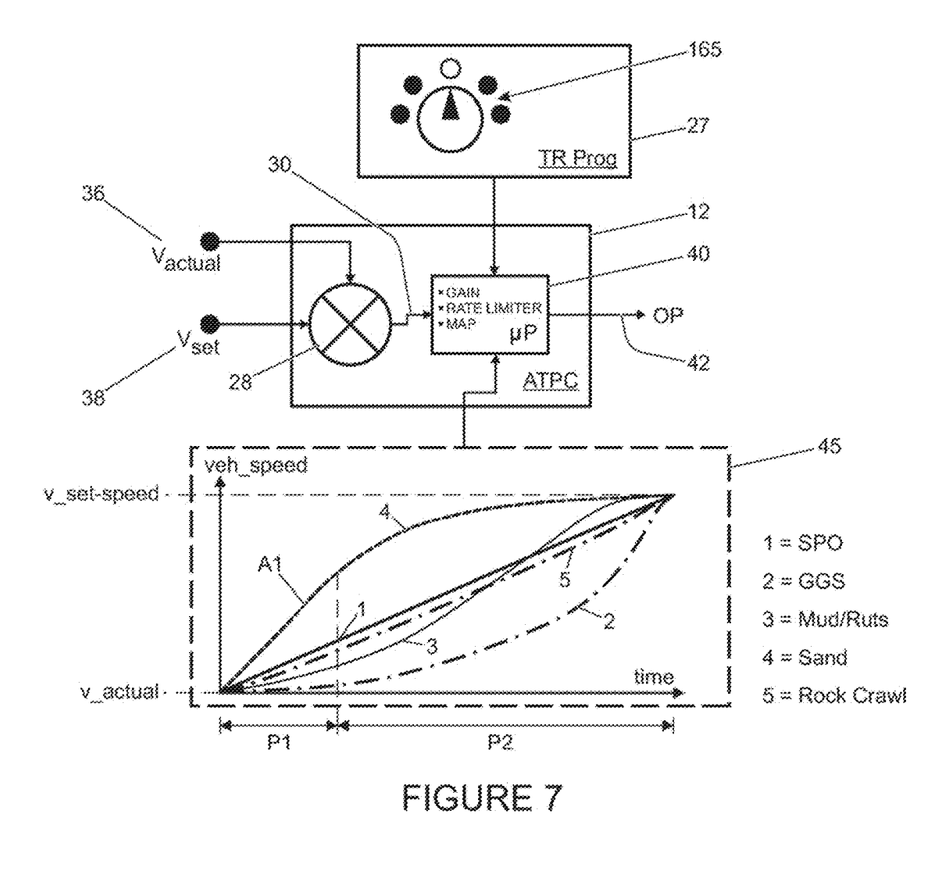
FIG. 7 shows a portion of a control system of a vehicle according to an embodiment of the present invention.

As shown in FIG. 7, the vehicle 100 has a driving mode selector dial 165 accessible to a driver of the vehicle 100 whilst driving. The dial 165 allows the driver to select one of a plurality of respective driving modes. As described above, each of the driving modes corresponds to a particular driving condition or set of driving conditions. In each driving mode, each of a plurality of vehicle sub-system controllers (including powertrain controller 11, a suspension controller 25, steering controller 170C and brake controller 13) is set to one of a plurality of respective function modes most appropriate to those conditions.

Such conditions are linked to types of terrain over which the vehicle may be driven and include a grass/gravel/snow (GGS) mode, mud and ruts (MR) mode, rock crawl (RC) mode, sand (S) mode and a highway mode known as a 'special programs off' (SPO) mode. A driving mode controller 27 (also referred to as a terrain response mode controller) is provided for controlling the sub-systems to operate in the required function mode according to the setting of the selector dial 165. In the present embodiment the driving mode controller 27 is also operable in an automatic mode in which the controller 27 determines automatically the driving mode most appropriate to the prevailing terrain, and selects that driving mode, i.e. controls the vehicle 100 to operate in that mode. The automatic mode is selectable by means of the selector dial 165.

Figure 8:
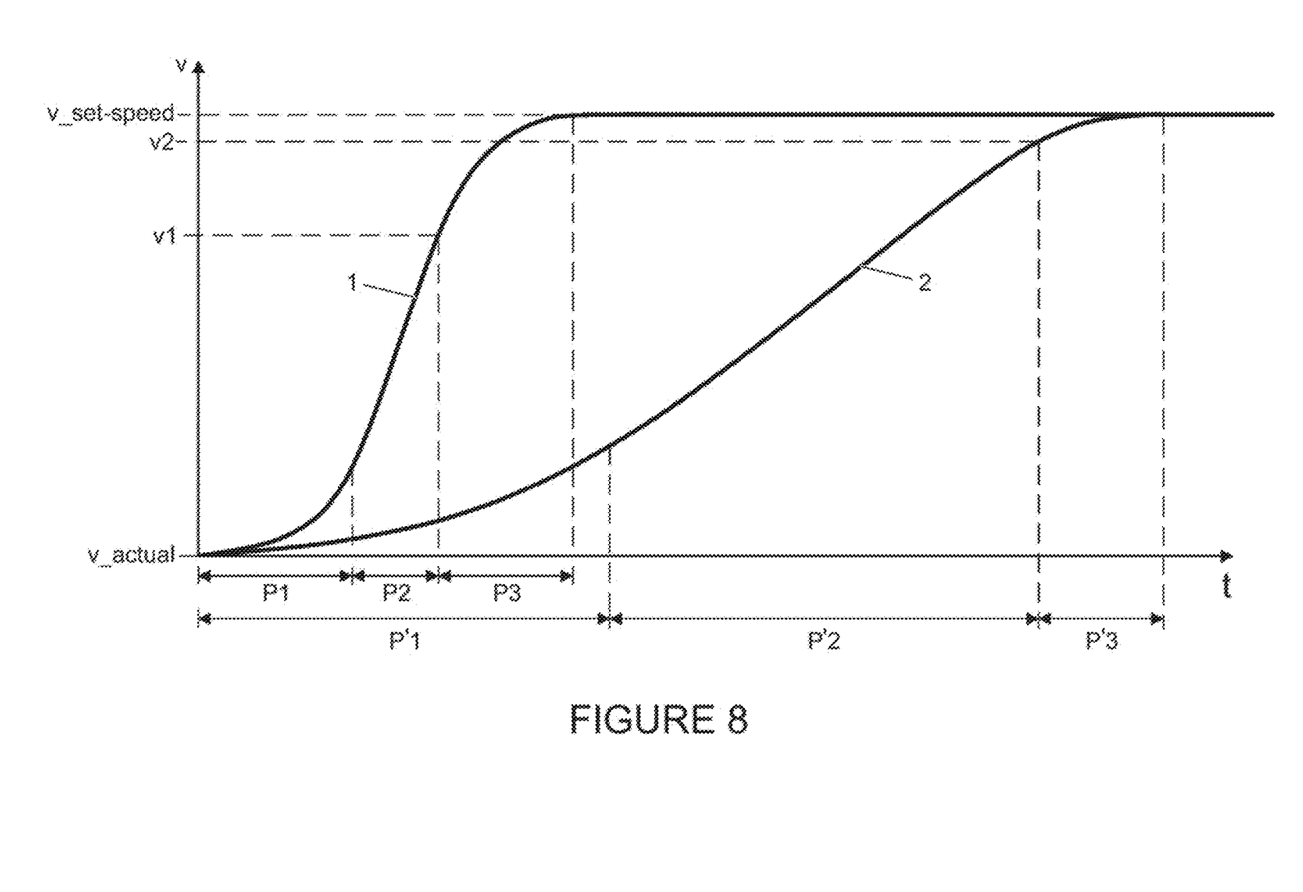
FIG. 8 shows traces of vehicle speed as a function of time for a vehicle operated in accordance with an embodiment of the present invention.

As shown in FIG. 7, the LSP control system 12 is configured to receive an input from the driving mode controller 27 corresponding to the identify of the currently selected driving mode. As shown in FIG. 5 and FIG. 8, the LSP control system 12 also receives a signal 36 indicative of vehicle speed and a signal 38 indicative of set-speed (target speed). Comparator 28 compares the set-speed signal 38 and measured speed signal 36 and provides an output signal 30 indicative of the comparison to an evaluator unit 40. The evaluator unit 40 is configured to determine a required rate of acceleration or deceleration of the vehicle 100 in order to increase or decrease vehicle speed to the set-speed.

The evaluator unit 40 is provided with date in a memory 45 corresponding to speed as a function of time for each available driving mode. From this data, the evaluator unit 40 is operable to determine a required speed of the vehicle 100 at a given moment in time whilst accelerating the vehicle 100 from Its current speed, v_current to the set-speed v_set-speed.

In some embodiments the evaluator unit 40 is configured to determine, from the data stored in the memory 45, the required rate of acceleration of the vehicle 100 at a given moment in time. It is to be understood that in some embodiments the evaluator unit 40 may also be configured to determine a required rate of deceleration of the vehicle 100 at a given moment in time when it is required to decrease vehicle speed to a set-speed that is less than current vehicle speed.

In the present embodiment, the evaluator 40 is configured to accelerate the vehicle to achieve a maximum allowable rate of acceleration for the currently selected driving mode. The vehicle is accelerated to the maximum allowable rate according to the data stored in the memory 45 for the currently selected driving mode. Subsequently, as vehicle speed approaches v_set-speed, the evaluator unit 40 is configured to reduce the rate of vehicle acceleration in accordance with the stored data for the currently selected operating mode in order to cause the vehicle to travel at speed v_set-speed. If the LSP control system 12 has temporarily reduced the maximum allowable value of set-speed, the evaluator unit 40 causes the vehicle to travel at the reduced value of set-speed.

The profiles shown inset in FIG. 7 show vehicle speed as a function of time during acceleration of the vehicle 100 from a nominal value of v_actual to a nominal value of v_set-speed. It is to be understood that the actual speed as a function of time may be determined by the evaluator 40 according to the stored data, once the values of v_actual and v_set-speed are known.

By way of illustration of operation of the embodiment shown, if the driving mode controller 27 indicates that the vehicle is operating in sand mode, the evaluator unit 40 controls the vehicle to accelerate according to profile 4 (FIG. 7). From the data, the evaluator unit 40 determines that for a first period of time P1, the vehicle 100 should be accelerated at a rate of acceleration A1 corresponding to the gradient of trace 4 during period P1. Subsequent to period P1, for a second period P2 the vehicle 100 should be accelerated at a rate that decreases according to the speed profile shown such that vehicle speed approaches v_set-speed in the illustrated manner. It is to be understood that the period P2 may be a substantially fixed period, corresponding to the period required to reduce the rate of acceleration in a manner that is comfortable to a user, whilst the period P1 may depend on the magnitude of the difference between v_actual and v_set-speed. If P2 is fixed, then it follows that the speed at which the rate of acceleration is reduced from the maximum value to zero may be a substantially fixed, absolute value of speed below v_set-speed. Other arrangements are also useful in some embodiments.

In each ease, for traces 1 to 5, the evaluator unit 40 causes the vehicle 100 to accelerate from v_actual to a rate of acceleration substantially equal to the maximum allowable rate for the prevailing driving mode. The evaluator unit 40 then reduces the rate of acceleration as the vehicle speed approaches v_set-speed in a manner corresponding to the applicable trace.

It is to be understood that other forms of trace or profile of speed or acceleration as a function of time may also be useful in some embodiments.

It is to be understood that the form of the profiles may be adjusted depending on whether the vehicle is being accelerated from a substantially stationary condition.

FIG. 8 shows two plots of vehicle speed as a function of time corresponding to alternate forms of characteristic profiles. Trace 1 is corresponds to a driving mode appropriate for travel over a dry asphalt surface (and corresponds to an SPO driving mode) whilst trace 2 corresponds to a driving mode appropriate to travel over a wet grass surface (and corresponds to a grass/gravel/snow (GGS) driving mode).

Each of the profiles has been divided into three periods: an initial period P1, P'1, during which the rate of acceleration is increased progressively until at the end of the period the maximum allowable rate for that driving mode is achieved; an intermediate period P2, P'2 during which the maximum allowable rate of acceleration is sustained for a period of time sufficient to achieve a speed v1, v2 that is within a prescribed amount of the set-speed v_set-speed; and a final period P3, P'3 during which the rate of acceleration is progressively reduced until the vehicle speed becomes substantially equal to v_set-speed.

In one embodiment, the LSP control system 12 is configured to determine the values of speed v1 or v2, depending on whether the selected driving mode is the SPO mode or GGS mode. The control system 12 causes the vehicle to accelerate during the respective initial period P1, P'1 to achieve the maximum allowable rate (which may be stored in the memory 45). Once this rate has been achieved, the LSP control system 12 causes this rate to be sustained until speed v1 or v2 is achieved, at which stage the system 12 controls the rate of acceleration to reduce in accordance with the characteristic profile of the selected driving mode.

Embodiments of the present invention have the advantage that a vehicle 100 may be accelerated from a current vehicle speed to a prescribed set-speed automatically, and in a controlled manner whereby vehicle composure may be maintained. The maximum rate of acceleration attained by the vehicle 100 during the period for which the vehicle speed is being increased is set in a manner appropriate to the terrain over which the vehicle is travelling. It is to be understood that for travel over certain surfaces such as dry asphalt (when the SPO driving mode is typically selected), the control system 12 may attempt to accelerate the vehicle 100 at a rate corresponding to a maximum value for which occupant comfort may be ensured, such as a rate of 1.25 metres per second per second (ms-2) or any other suitable value, in the case of travel over a relatively slippery surface (when the GGS mode may be selected) the maximum allowable rate may be reduced in order to avoid excessive wheel slip, for example to a value of 0.5 ms-2 or any other suitable value.

The gradient of trace 1 of FIG. 8 can be seen to be steeper than that of trace 2 during the intermediate periods P2, P'2, indicating a higher maximum value of allowable acceleration rate when operating in the SPO driving mode compared with the GGS driving mode.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An off-road speed control system for controlling the speed of a vehicle, the system comprising:
   one or more sensors operable to generate a signal indicative of the speed of the vehicle; and
   a controller in communication with the one or more sensors, the controller being configured to receive the signal indicative of the speed of the vehicle, and being operable, in dependence thereon, to automatically cause the vehicle to accelerate from a first speed to a second speed in accordance with a selected one of a plurality of predefined stored acceleration profiles, each of said plurality of profiles being stored in a memory of the controller, the plurality of predefined store acceleration profiles including:
   a first predefined stored acceleration profile comprising stored data configured to cause the vehicle to accelerate from the first speed until the vehicle reaches the second speed at a prescribed rate of acceleration as a first function of time, the first profile corresponding to a first type of ground surface; and
   a second predefined stored acceleration profile comprising stored data configured to cause the vehicle to accelerate from the first speed until the vehicle reaches the second speed at a prescribed rate of acceleration as a second function of time, the second profile corresponding to a second type of ground surface;
   wherein the respective prescribed rates of acceleration of the first profile and the second profile each vary while the vehicle is accelerating from the first speed to the second speed such that the first function of time of the first predefined stored acceleration profile is different from the second function of time of the second predefined stored acceleration profile, one of the first profile or the second profile being selected by matching a current type of ground surface over which the vehicle is operating with one of the first type of ground surface or the second type of ground surface.

2. A system according to claim 1 operable to select automatically a vehicle operating mode in dependence on the type of ground surface over which the vehicle is operating.

3. A system according to claim 2 operable to allow a user to select the vehicle operating mode.

4. A system according to claim 1 operable to determine a value of required vehicle speed at a given moment in time from the selected profile and to cause the vehicle to travel in accordance with the required speed, thereby to cause the vehicle to accelerate from the first speed to the second speed in accordance with the selected profile.

5. A system according to claim 1 wherein the first speed corresponds to a current value of vehicle speed and the second speed corresponds to a set-speed.

6. A system according to claim 1 operable to cause a powertrain to develop drive torque to accelerate one or more wheels of the vehicle and to control a braking system to develop brake torque to counter powertrain torque.

7. A system according claim 6 operable to cause the braking system to develop brake torque to counter powertrain torque in dependence on the selected acceleration profile.

8. A vehicle comprising the system according to claim 1.

9. A system according to claim 1 wherein the plurality of predefined stored acceleration profiles includes at least a third predefined stored acceleration profile, wherein:
   the first function of time of the first predefined stored acceleration profile prescribes vehicle acceleration from the first to the second speed that includes an initial acceleration that is greater than a subsequent acceleration;
   the second function of time of the second predefined stored acceleration profile prescribes vehicle acceleration from the first to the second speed that includes an initial acceleration that is less than a subsequent acceleration; and
   the third predefined stored acceleration profile prescribes vehicle acceleration from the first to the second speed that is substantially constant.

10. A system according to claim 1 wherein at least one of the predefined stored acceleration profiles includes a first period during which acceleration progressively increases, a second period following the first wherein acceleration is substantially constant, and a third period following the second wherein acceleration is progressively reduced as the vehicle reaches the second speed.

11. The system according to claim 1, wherein the ground surface includes one of a first ground surface and a second ground surface, the second ground surface being relatively slippery in comparison to the first ground surface, wherein a first one of the predefined stored acceleration profiles corresponding to the first ground surface includes a first maximum allowable acceleration rate that is greater than a second maximum allowable acceleration rate included in a second one of the predefined stored acceleration profiles, the second predefined stored acceleration profile corresponding to the second ground surface.

12. The system according to claim 1, wherein the first type of ground surface is sand and the second type of ground surface is a relatively low friction surface in comparison to the first type of ground surface.

13. The system according to claim 12, wherein the relatively low friction surface is one of grass, gravel or snow.

14. The system according to claim 12, wherein:
   the first function of time of the first predefined stored acceleration profile prescribes vehicle acceleration from the first to the second speed that includes an initial acceleration; and
   the second function of time of the second predefined stored acceleration profile prescribes vehicle acceleration from the first to the second speed that includes an initial acceleration that is less than the initial acceleration prescribed by the first function of time.

15. The system according to claim 1, wherein the first type of ground surface is sand and the second type of ground surface is one of mud or rock.

16. The system according to claim 1, wherein the first type of ground surface is one of mud or rock and the second type of ground surface is a relatively low friction surface in comparison to the first type of ground surface.

17. The system according to claim 16, wherein the relatively low friction surface is one of grass, gravel or snow.

18. The system according to claim 1, wherein the first type of ground surface and the second type of ground surface are each one of: grass, gravel, snow; mud; rock; or sand.

19. A method of controlling the speed of a vehicle using an off-road speed control system, the method comprising:
   receiving a signal from one or more sensors at a controller of the off-road speed control system, the signal indicative of the speed of the vehicle;
   based upon the signal, automatically causing the vehicle to accelerate from a first speed to a second speed in accordance with a selected one of a plurality of predefined stored acceleration profiles, wherein each one of said plurality of profiles is stored in a memory of the controller, the plurality of predefined stored acceleration profiles including:
   a first predefined stored acceleration profile comprising stored data configured to cause the vehicle to accelerate from the first speed until the vehicle reaches the second speed at a prescribed rate of acceleration as a first function of time, the first profile corresponding to a first type of ground surface; and
   a second predefined stored acceleration profile comprising stored data configured to cause the vehicle to accelerate from the first speed until the vehicle reaches the second speed at a prescribed rate of acceleration as a second function of time, the second profile corresponding to a second type of ground surface;
   wherein the respective prescribed rates of acceleration of the first profile and the second profile vary while the vehicle is accelerating from the first speed, such that the first function of time of the first predefined stored acceleration profile is different from the second function of time of the second predefined stored acceleration profile, one of the first profile or the second profile being selected by matching a current type of ground surface over which the vehicle is operating with one of the first type of ground surface or the second type of ground surface.

20. The method according to claim 19, wherein the plurality of predefined stored acceleration profiles includes at least a third predefined stored acceleration profile, wherein:
   the first function of time of the first predefined stored acceleration profile prescribes vehicle acceleration from the first to the second speed that includes an initial acceleration that is greater than a subsequent acceleration;
   the second function of time of the second predefined stored acceleration profile prescribes vehicle acceleration from the first to the second speed that includes an initial acceleration that is less than a subsequent acceleration; and
   the third predefined stored acceleration profile prescribes vehicle acceleration from the first to the second speed that is substantially constant.

21. The method according to claim 19, wherein at least one of the predefined stored acceleration profiles includes:
   a first period, wherein acceleration progressively increases;
   a second period following the first, wherein acceleration is substantially constant; and
   a third period following the second, wherein acceleration is progressively reduced as the vehicle reaches the second speed.

22. The method according to claim 19, wherein the ground surface includes one of a first ground surface and a second ground surface, the second ground surface being relatively slippery in comparison to the first ground surface, wherein a first one of the predefined stored acceleration profiles corresponding to the first ground surface includes a first maximum allowable acceleration rate that is greater than a second maximum allowable acceleration rate included in a second one of the predefined stored acceleration profiles, the second predefined stored acceleration profile corresponding to the second ground surface.

\* \* \* \* \*